United States Patent [19]
Holz

[11] 3,743,099
[45] July 3, 1973

[54] SORTING PRESSURE FILTER APPARATUS

[75] Inventor: Emil Holz, Eningen, Germany

[73] Assignee: Hermann Finckh Metalltuch-Und Maschivenfabrik, Reutlingen, Germany

[22] Filed: June 9, 1971

[21] Appl. No.: 151,288

[30] Foreign Application Priority Data
June 11, 1970 Germany............... P 20 28 694.6

[52] U.S. Cl................................. 210/333, 210/345
[51] Int. Cl............................................. B01d 29/38
[58] Field of Search.................. 210/332, 333, 334, 210/345

[56] References Cited
UNITED STATES PATENTS

| | | | |
|---|---|---|---|
| 519,275 | 5/1894 | Sellenscheidt et al. | 210/345 |
| 820,483 | 5/1906 | Dion | 210/334 |
| 2,173,060 | 9/1939 | Andrews | 210/333 |

Primary Examiner—Frank A. Spear, Jr.
Attorney—Michael S. Striker

[57] ABSTRACT

A sorting pressure filter apparatus has a vertical tubular wall forming an inner space and an outer annular space provided with inlet means and outlet means, respectively, and connected by several superimposed annular rows of tubular filters surrounding the tubular wall. The filters project radially from the tubular wall into the outer annular chamber. Each filter is provided with a motor and blades driven by the motor and cleaning the respective filter. In one embodiment, radial walls divide the housing so that pairs of inner and outer space portions are formed, which can be connected in series for consecutive filter operations.

9 Claims, 6 Drawing Figures

Inventor:
EMIL HOLZ 3,743,099

SORTING PRESSURE FILTER APPARATUS

BACKGROUND OF THE INVENTION

Pressure filter apparatus is known in which tubular filters in upright position surround an inner inlet space, and are connected by the same by short radial tubes. The arrangement requires a great deal of horizontal space. The effective total filter surface can only be increased by providing annular filter rows of greater diameter. In accordance with the prior art, a centrally located blade rotor is common for all filters and consequently requires a great deal of space and substantial power.

SUMMARY OF THE INVENTION

It is one object of the invention to overcome the disadvantages of the prior art and to provide a filter apparatus requiring a small horizontal area for a comparatively great filter surface.

With these objects in view, the present invention provides preferably tubular screening filters arranged in a star-shaped pattern in an annular row. Each filter is provided with an individual motor for driving cleaning blades running around the inner or outer surfaces of the respective filter. In such an arrangement, the number of the filters, and thereby the entire effective filter surface can be increased, without increase of the diameter of the apparatus, by providing a plurality of superimposed annular rows of radially projecting filters. Irrespective of the number of annular rows of filters, the diameter and the horizontal space requirements of the apparatus are not changed, but only the height is increased. Due to the fact that for each filter, an individual motor and cleaning blade means is provided, a central large blade rotor according to the prior art can be avoided, which results in smaller power requirements for the same filter and sorting effect.

A sorting pressure filter apparatus according to one embodiment of the invention, comprises housing means having wall means forming an annular outer space and an inner space surrounded by the outer space; and at least one annular row of filter means located in the outer space outwardly projecting from the inner space.

Each filter means has an inner chamber communicating with the inner space. One of the spaces is an inlet space, and the other space is an outlet space.

Inlet means are connected with the inlet space for supplying into the same a medium including fluid and solid matters suspended in the same, so that screened fluid passes through the filter means into the outlet space, while solid matter is at least partly retained by the filter means in the inlet space. Outlet means are connected with the outlet chamber for discharging the screened fluid, and other outlet means may be provided for discharging from the inlet chamber the filter retained sorted solid matter.

Preferably, the housing wall means includes a tubular wall having a vertical axis, and a plurality of annular rows of filter means are spaced in axial direction along the tubular wall. The filter means are tubular and project in radial direction into the outer annular space. A motor is mounted at the outer end of each filter means and drives blade means which clean the surface of the filter means, preferably the inner cylindrical surface.

In one embodiment of the invention, the housing means has a plurality of radial walls extending through the inner space and the outer space so that these spaces are divided into pairs of inner space portions and outer space portions. Conduit means connect the outlet of at least one outlet space portion with the inlet of an inlet space portion of another pair so that the medium flows successively through two filter means for successive sorting of the solid matter. It is also possible to supply the solid matter sorted by one filter to another filter for additional filtering and sorting of the solid matter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
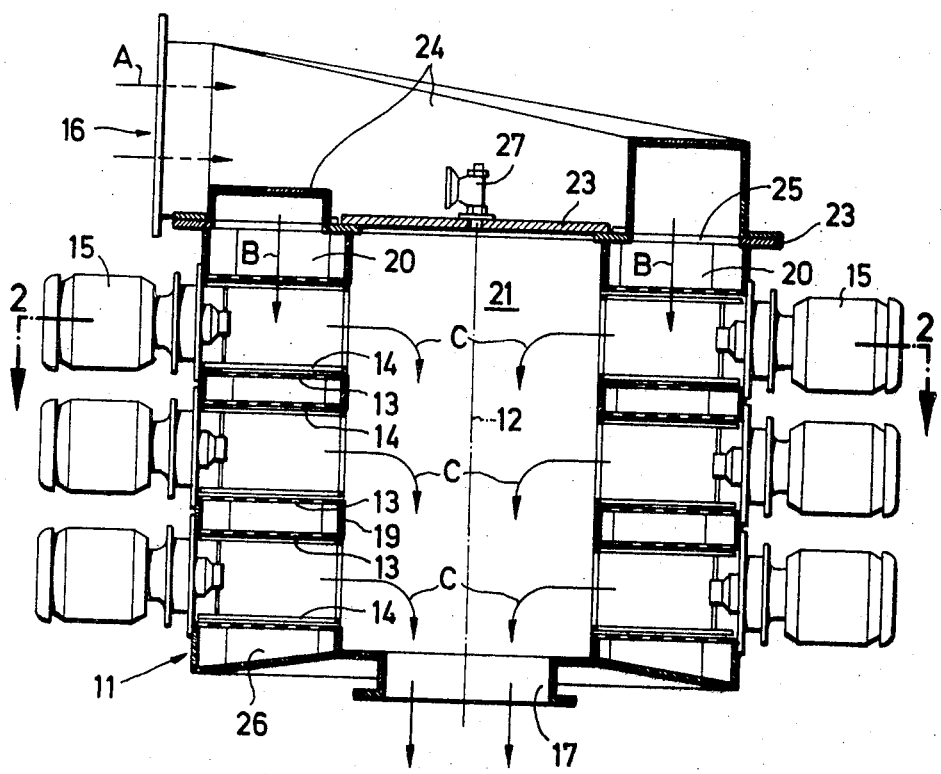
FIG. 1 is a vertical axial sectional view taken along line 1—1 in FIG. 2, and illustrating a first embodiment of the invention.
Figure 2:
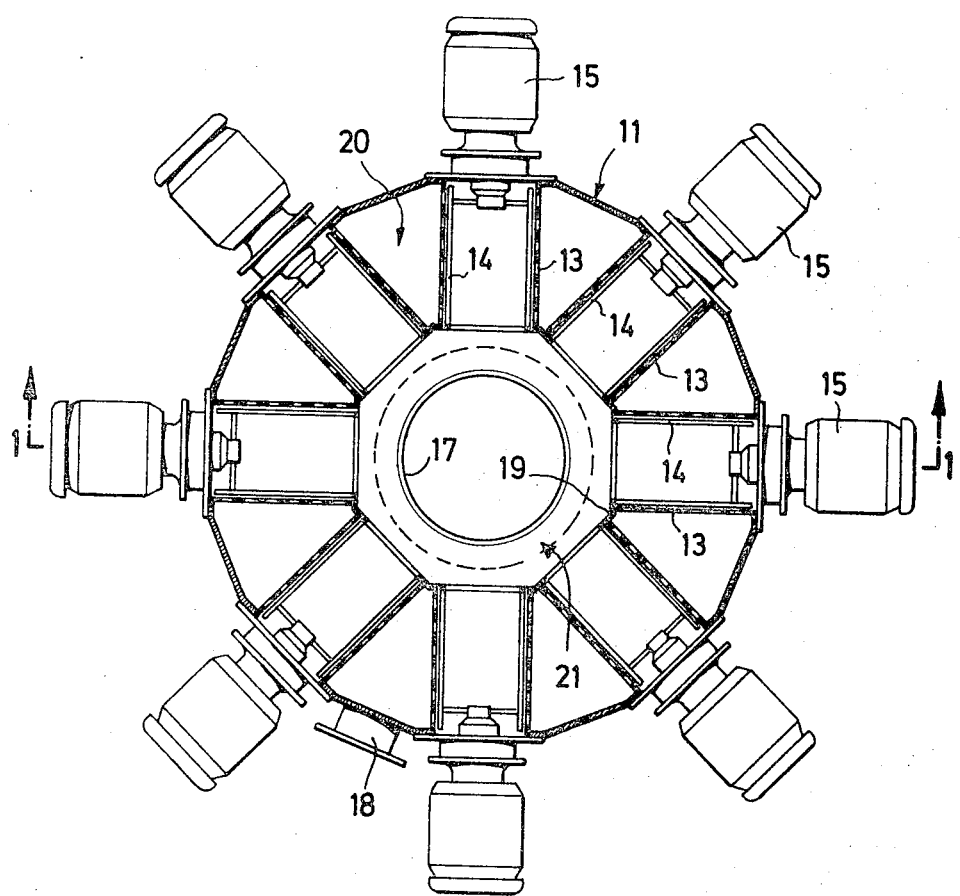
FIG. 2 is a horizontal cross-sectional view taken on line 2—2 of FIG. 1.

Referring now to the drawing, and particularly to FIGS. 1 and 2, a substantially cylindrical housing 11 has an upper end closed by a cover 23 which has an inlet means 16 with a tubular means 24 arranged above an annular opening 25 in cover 23. The interior of housing 11, which has a vertical axis 12, is divided by an annular wall 19 into an outer inlet space 20 for the unfiltered medium supplied by inlet means 16, and an inner annular outlet space 21 for the fluid from which suspended solid matter has been removed by screening filters 13. The annular opening 25 in cover 23 is disposed so that the suspension entering through tubular means 24 enters the outer annular space 20, which is traversed by a plurality of tubular filters 13. The tubular filters 13 are arranged in three superimposed annular rows of filters 13 which radially project from the tubular wall 19 into the outer annular space 20.

Rotary blade means 14 are located in each tubular filter 13, and each blade means 14 is driven by an individual motor 15 to move along the cylindrical inner surface of the respective filter 13. Motors 15 are secured to the outer annular wall of housing 11.

During a filtering operation, a medium, including a fluid and solid matter in suspension, enters in horizontal direction, as indicated by arrows A, into the inlet means 16 and is guided by the tubular means 24 through the annular opening 25 in the vertical downward direction of arrows B into the outer annular inlet space 20. The medium flows through the screening openings in the tubular filters 13 from the outside of the same to the inner chamber within each filter 13, where the cleaning blades 14, driven by the drive motor 15, move along the inner surface of the respective filter, so that screened and sorted matter flows with the fluid in the direction of the arrows C into the inner outlet space 21 and toward the bottom of the same where an outlet means 17 for screened fluid is provided. The solid matter retained by the filters, and loosened by the blade means 14 which may also be arranged on the outer surface of the filters, accumulates in a channel 26 from which the solid matter can be discharged through a second outlet means 18, as shown in FIG. 2.

Figure 3:
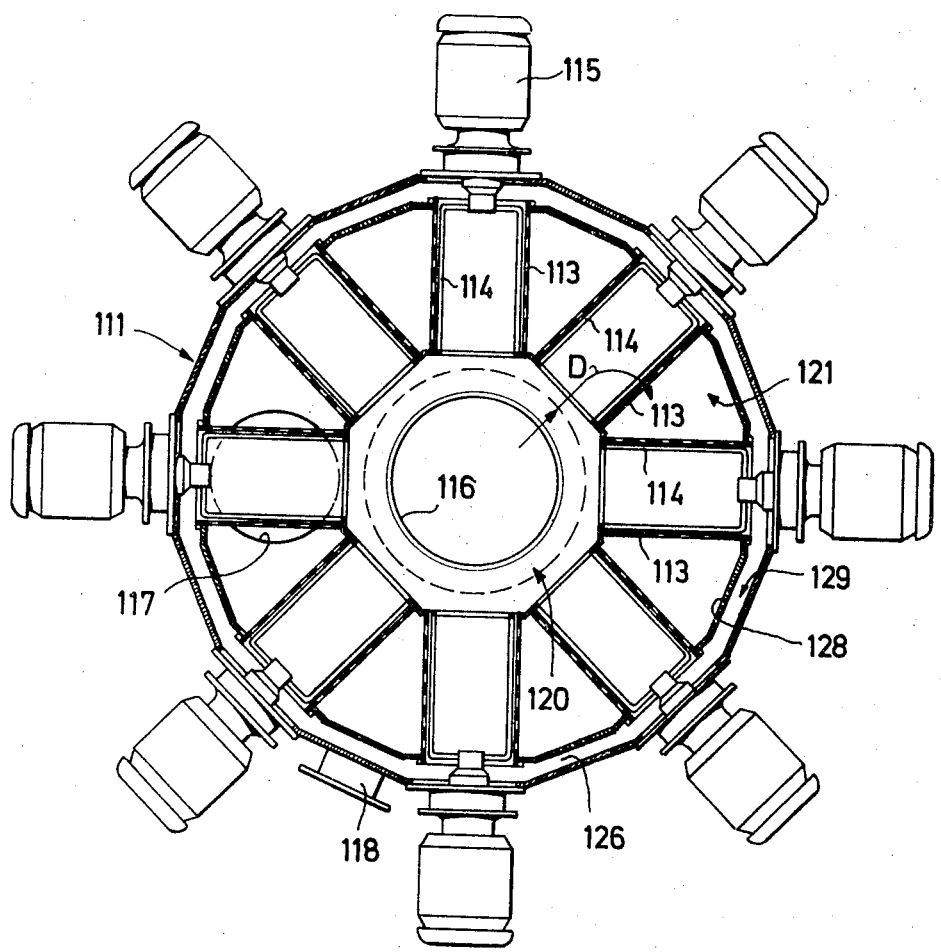
FIG. 3 is a horizontal cross-sectional view illustrating a second embodiment of the invention.

In the embodiment of FIG. 3, parts corresponding to the parts of the embodiment of FIGS. 1 and 2, are indicated by corresponding reference numerals which are increased by 100.

While in the embodiment of FIGS. 1 and 2, the outer annular chamber 20 is the inlet chamber and the inner chamber 21 is the outlet chamber, in the embodiment of FIG. 3, the inlet means 116 for the medium is located at the center of the bottom of the housing 111, and the unfiltered medium enters the inner inlet space 120 which is surrounded by the annular outlet space 121 in which the tubular filters 113 are located. Blades 114 are located in the inner chamber of the tubular filters 13, and are rotated by motors 115. A cleaning of the filters 113 can be obtained by back rinsing.

The suspension, or other medium to be filtered, enters through the inlet means 116 in vertical upward flow. In the region of the several annular rows of tubular filters 113, the fluid is deflected in direction of the arrow D, and flows through the openings in the tubular filters 13 into the outer annular outlet space 121 where the clean fluid flows downward and out of outlet means 117 in the bottom wall of the housing.

The filtered solid matter flows into an annular outer space 129 formed by tubular walls 128, and is discharged through a second outlet means 118 in radial direction.

In the embodiment of FIGS. 1 and 3, it is immaterial whether the filter openings in filters 13 are slots, or round holes. It is also immaterial whether the cleaning blades 14 and 114 run around the filter surface where the medium enters, or the filter surface where the medium leaves the filter.

Figure 4:
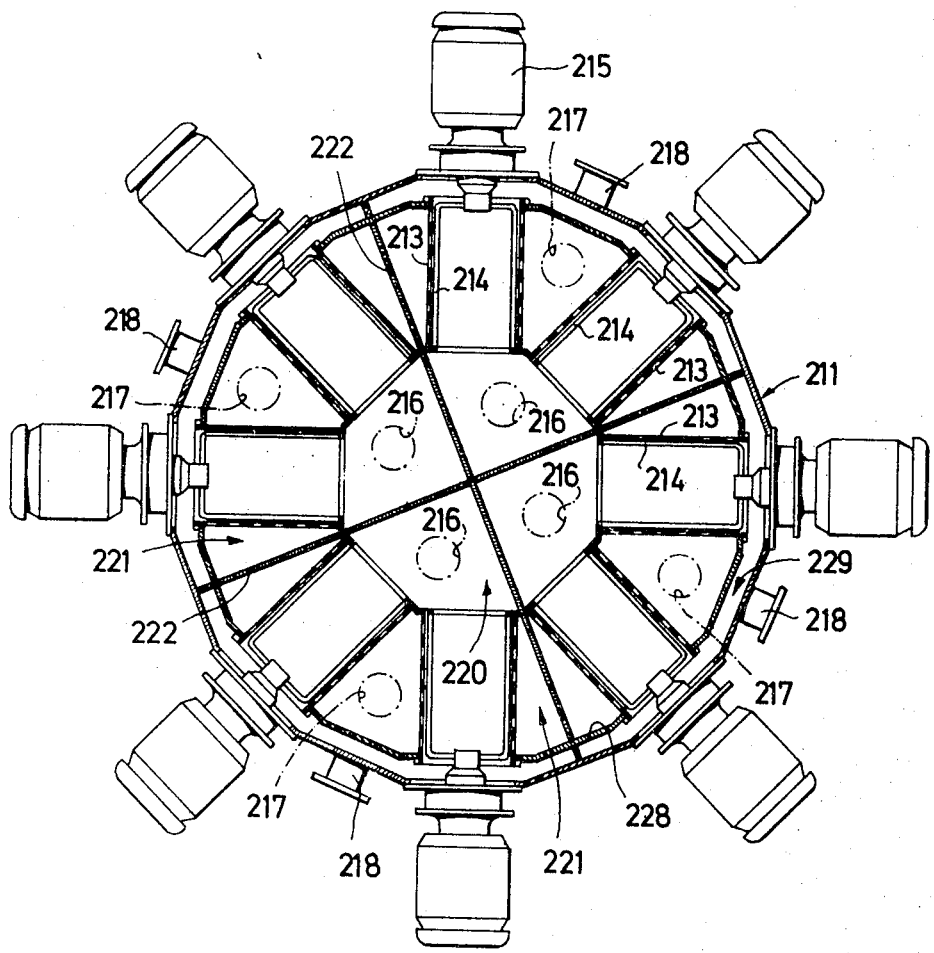
FIG. 4 is a horizontal cross-sectional view illustrating a third embodiment of the invention provided with radial walls.

The embodiment of FIG. 4 corresponds substantially to the embodiment of FIG. 3, and corresponding parts are indicated by reference numerals to which 200 has been added. In the embodiment of FIG. 4, four radial walls, or two diametral walls 222 are provided which divide the interior of housing 211 into four parts. The four sector-shaped parts are connected in series, as will be explained in greater detail with reference to FIG. 5, so that a successive sorting by successive filters is possible in which the width of the screening openings of successive filters is reduced for every filter. However, it is also possible to connect only the first three sector shaped parts in series, and to use the fourth sector-shaped part for a final sorting which requires that the second outlets 218 of the three first sections are connected with the inlet 216 of the fourth sector, so that the solid matter is filtered and sorted a second time.

As shown in FIG. 4, each of the sectors formed by two radial walls 22, has an inner inlet space portion provided with an inlet 216, and an outlet space portion which is part of the outer annular outlet space 221.

Four inlets 216, four outlets 217 for clean fluid, and four second outlets 218 for solid matter are provided.

The inner inlet space 220 is divided by walls 222 into four inlet space portions, and the annular outer outlet space 221 for screened fluid is divided into four outlet space portions, in each of which two filters 213 of each annular superimposed row of filters 213 are located.

Figure 5:
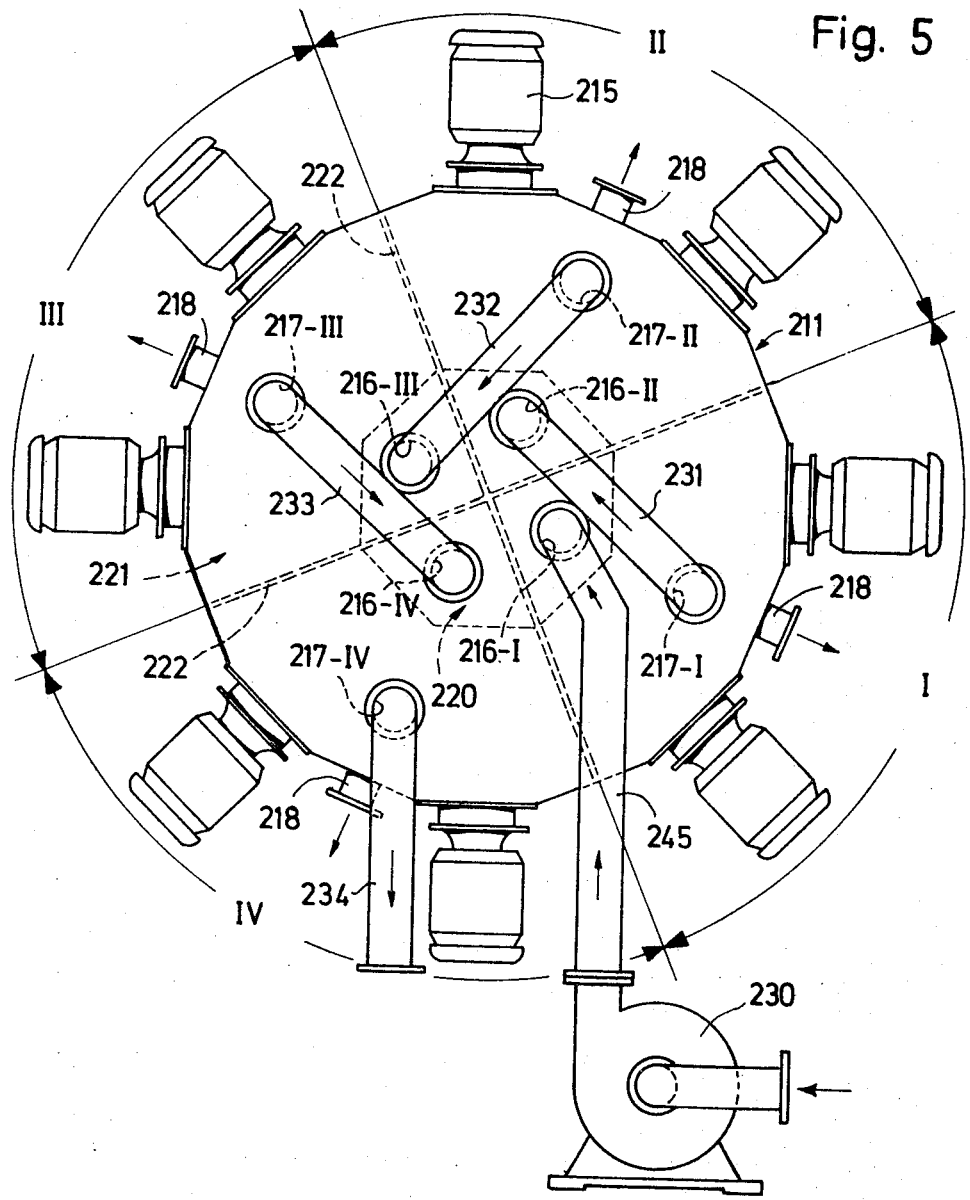
FIG. 5 is a plan view of the embodiment of FIG. 4 illustrating connecting pipes for effecting successive filtering and sorting by several filters.

Referring now to FIG. 5, which is substantially a plan view of the embodiment of FIG. 4, the radial walls 222 are used in this arrangement, together with connecting conduit means 231, 232, 233, to obtain four sorting and filtering stages I-IV. A pressure pump 230 pumps the medium through a tubular conduit 245 into the inlet 216-I of stage I. The medium flows through the respective inner inlet space portion, the respective filter 213, see FIG. 4, and the respective outlet portion of the outer space 221 and out of outlet 217-I. The partly filtered medium flows through the connecting pipe 231 into the inlet 216-II of the second stage II and after filtering out of outlet 217-II and connecting pipe 233 to the inlet 216-III of the third stage III where the medium is again filtered and then flows out of outlet 217-III. The fluid flows from there to the connecting pipe 233 to the inlet 216-IV of the fourth stage IV, and out of outlet 217-IV into the outlet pipe 234 from where the filtered fluid is discharged.

Figure 6:
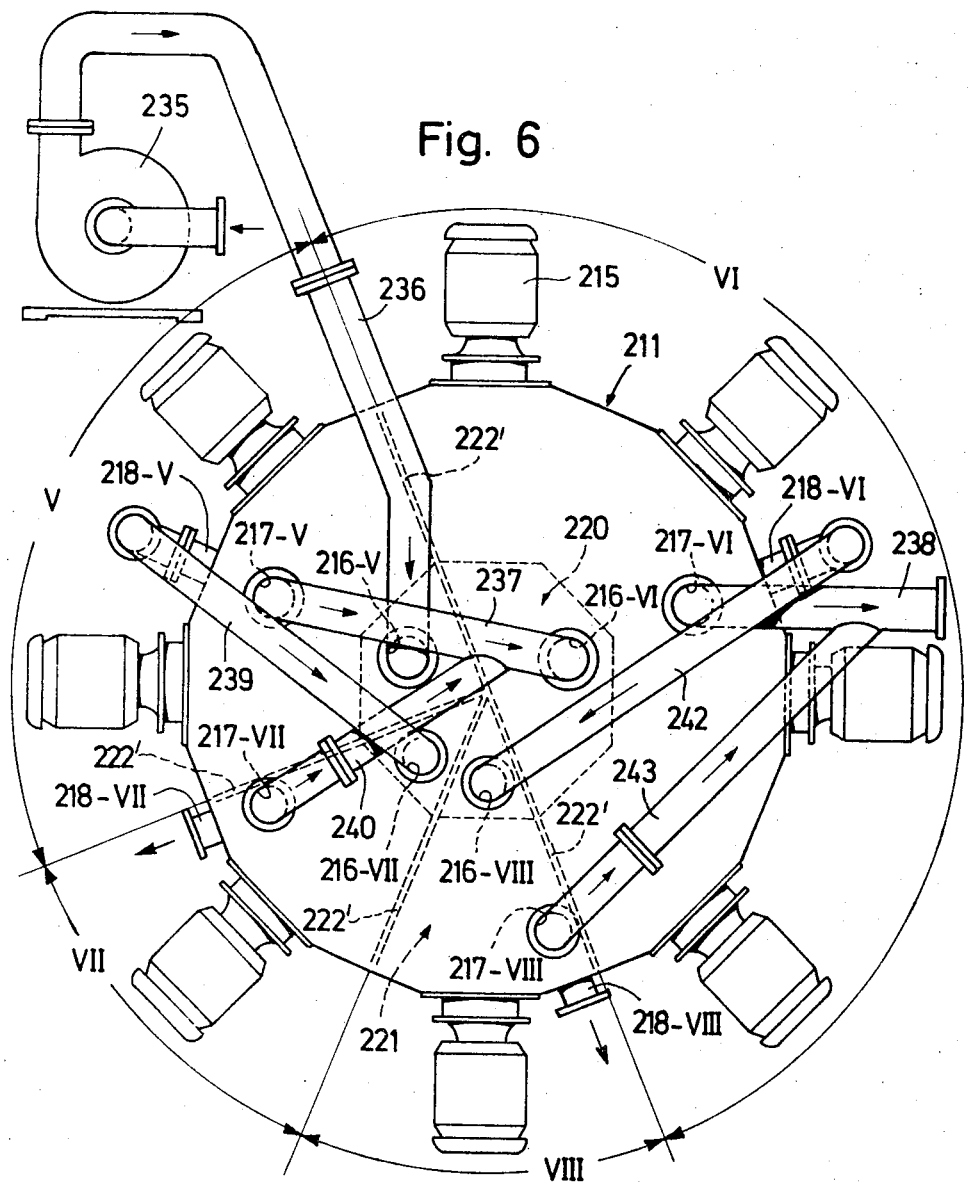
FIG. 6 is a plan view of a modified embodiment.

In the embodiment of FIG. 6, whose inner construction corresponds to the embodiment of FIG. 3, radial walls 222' are not spaced 90° as in the arrangement shown in FIG. 5, but form one 90° sector V, one 180° sector VI, and two 45° sectors VII and VIII. Sectors V and VI form two stages which are connected in series, as will be explained hereinafter, while sectors VII, VIII form two stages for final sorting of the solid matter.

A pressure pump 235 pumps the suspension to be filtered and sorted through the conduit 236 to the inlet 216-V of sector V in which the first filter stage of the apparatus carries out a rough main sorting. The filter 213 of stage V may have screening openings having a diameter of 2 mm. The filtered medium passes through outlet 217-V of stage V and a connecting tube 237 into the inlet 216-VI of stage VI in which filters 213 effect a fine sorting by means of filter openings having a diameter of 0.4 mm. The filtered medium flows out of outlet 217-VI into a connecting tube 238 from where the fluid is discharged.

The final sorting of the solid matter separated in sectors V and VI, and flowing out of second outlets 218-V and 218-VI, is supplied through outlet 218-V, connecting pipe 239, and inlet 216-VII into the sector VII. The final sorting of this filtered solid matter can be obtained by filters having filter openings with a diameter of 1.8 mm. The sorted medium flows out of outlet 217-VII of sector VII and a connecting tube 240 into the tube 237, and together with the fluid filtered in the first sector I into the second II where it is subjected to fine sorting. The solid matter of sector VII leaves through the solid matter outlet 218-VII. The solid matter separated in sector VI, which forms the second stage of the main sorting, flows through the solid matter outlet 218-VI, a connecting tube 242, and the inlet 216-VII into sector VII where a filter 213 with filter openings of 0.3 mm is provided. The suspension sorted in sector VIII flows out of outlet 217-VIII and the connecting tube 243 to the tube 238 where it flows, together with the suspension sorted in sector V out of the apparatus. A solid matter outlet 218-VIII discharges the solid matter separated during the final sorting in sector VIII.

It will be understood that each of the elements described above, or two or more together, may also find a useful application in other types of filter apparatus differing from the types described above.

While the invention has been illustrated and described as embodied in a filter apparatus having a plurality of superimposed annular rows of radially projecting tubular filters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential features of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Sorting pressure filter apparatus comprising housing means having wall means forming an annular outer space, and an inner space surrounded by said outer space; at least one annular row of perforated filter means located in said outer space outwardly projecting from said inner space, each filter means having an inner chamber communicating with said inner space, one of said spaces being an inlet space, and the other space being an outlet space; inlet means connected with said inlet space for supplying into the same a medium including a fluid and solid matter suspended in the same so that filtered fluid passes through said filter means into said outlet space, while solid matter is at least partly retained by said filter means in said inlet space; outlet means connected with said outlet chamber for discharging said filtered fluid; a motor mounted at the outer end of each filter means; and a blade means located adjacent a surface of each filter means, and being driven by the respective motor to clean said surface.

2. Filter apparatus as claimed in claim 1 wherein said housing wall means includes a substantially tubular wall having a vertical axis; wherein said filter means of said annular row are tubular and project outward in radial directions from said tubular wall; and wherein the inner ends of said tubular filter means are open and form openings in said tubular wall through which said inner chambers of said filter means communicate with said inner space.

3. Filter apparatus as claimed in claim 2 comprising a plurality of said annular rows of filter means spaced in axial direction along said tubular wall.

4. Filter apparatus as claimed in claim 1 wherein each filter means is tubular and has a cylindrical surface; and wherein each blade means includes blade means moving around the respective cylindrical surface.

5. Filter apparatus as claimed in claim 1 comprising a plurality of said annular rows of filter means having a common vertical axis and being located in horizontal planes.

6. Filter apparatus as claimed in claim 1 wherein said inner space is said inlet space, and said outer annular space is said outlet space; wherein said housing means has an outer annular wall forming a second annular space surrounding said outer annular outlet space; wherein said filter means are tubular and have inner open ends communicating with said inner inlet space, and outer open ends communicating with said second annular space for discharging filtered solid matter.

7. Sorting pressure filter apparatus comprising housing means having wall means forming an annular outer space, and an inner space surrounded by said outer space; at least one annular row of filter means located in said outer space outwardly projecting from said inner space, each filter means having an inner chamber communicating with said inner space, one of said spaces being an inlet space, and the other space being an outlet space; inlet means connected with said inlet space for supplying into the same a medium including a fluid and solid matter suspended in the same so that filtered fluid passes through said filter means into said outlet space, while solid matter is at least partly retained by said filter means in said inlet space; and outlet means connected with said outlet chamber for discharging said filtered fluid, said housing means having a plurality of radial walls, each radial wall extending through said inner space and said outer space so that the same are divided into pairs of inner-space portions and outer-space portions, one of which is an inlet space portion and the other is an outlet space portion; said inlet means including an inlet for each inlet space portion, and said outlet means including an outlet for each outlet space portion.

8. Filter apparatus as claimed in claim 7 comprising conduit means outside of said housing connecting said outlet of at least one of said outlet space portions of a pair of inlet and outlet space portions with said inlet of one of said inlet space portions of another pair so that said medium flows successively through the two filter means associated with the respective two pairs for successive sorting of said solid matter.

9. Filter apparatus as claimed in claim 7 comprising a plurality of second outlets connected with said inlet space portions, respectively, for discharging solid matter retained by said filter means; and wherein at least one second outlet associated with the filter means of one of said pairs of inlet and outlet space portions is connected with said inlet of another pair of inlet and outlet space portions so that the solid matter retained by said filter means is again filtered and sorted.

* * * * *

UNITED STATES PATENT OFFICE
CERTIFICATE OF CORRECTION

Patent No. 3,743,099          Dated July 3, 1973

Inventor(s) Emil Holz

It is certified that error appears in the above-identified patent and that said Letters Patent are hereby corrected as shown below:

On the cover sheet, in the heading, item [73] "Hermann Finckh Metalltuch-Und Maschivenfabrik" should read -- Hermann Finckh Metalltuch-Und Maschinenfabrik --.

Signed and sealed this 14th day of May 1974.

(SEAL)
Attest:

EDWARD M.FLETCHER,JR.          C. MARSHALL DANN
Attesting Officer                 Commissioner of Patents